(12) United States Patent
Yang

(10) Patent No.: US 7,637,473 B2
(45) Date of Patent: Dec. 29, 2009

(54) DATE CODE MARKING SYSTEM

(75) Inventor: Shih-Sheng Yang, Taipei (TW)

(73) Assignee: Universal Trim Supply Co., Ltd., Taipei Hsien (TW)

( * ) Notice: Subject to any disclaimer, the term of this patent is extended or adjusted under 35 U.S.C. 154(b) by 398 days.

(21) Appl. No.: 11/726,670

(22) Filed: Mar. 22, 2007

(65) Prior Publication Data

US 2008/0290248 A1 Nov. 27, 2008

(51) Int. Cl.
*B29C 33/42* (2006.01)
*B29C 45/37* (2006.01)

(52) U.S. Cl. .............. 249/53 R; 249/103; 249/104

(58) Field of Classification Search ......... 249/103–104, 249/53 R; 425/572, 577, 556, 588; 264/334
See application file for complete search history.

(56) References Cited

U.S. PATENT DOCUMENTS

| 4,384,702 A * | 5/1983 | Boskovic ............... 249/103 |
| 5,902,512 A * | 5/1999 | Streit ................... 249/103 |
| 6,308,929 B1 * | 10/2001 | Wieder ................. 249/103 |

* cited by examiner

*Primary Examiner*—Yogendra Gupta
*Assistant Examiner*—Thu Khanh T Nguyen
(74) *Attorney, Agent, or Firm*—Leong C. Lei

(57) ABSTRACT

A mold coding device and method for providing identifying information on a molded part. The surface of the molded part having at least one multiple identifying information element formed in the molded part and a pointing means on the molded part for selecting the identifying information elements.

2 Claims, 14 Drawing Sheets

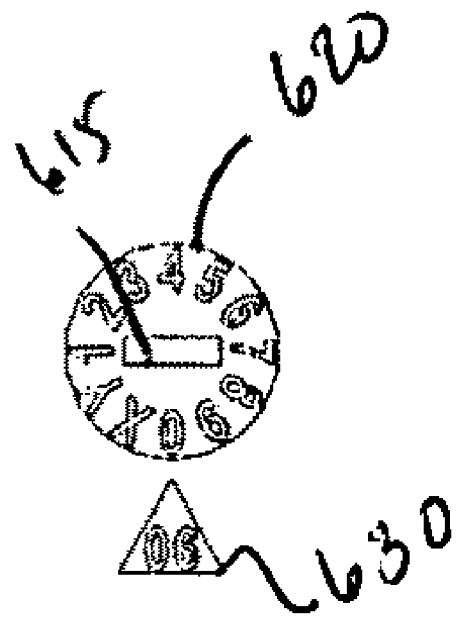
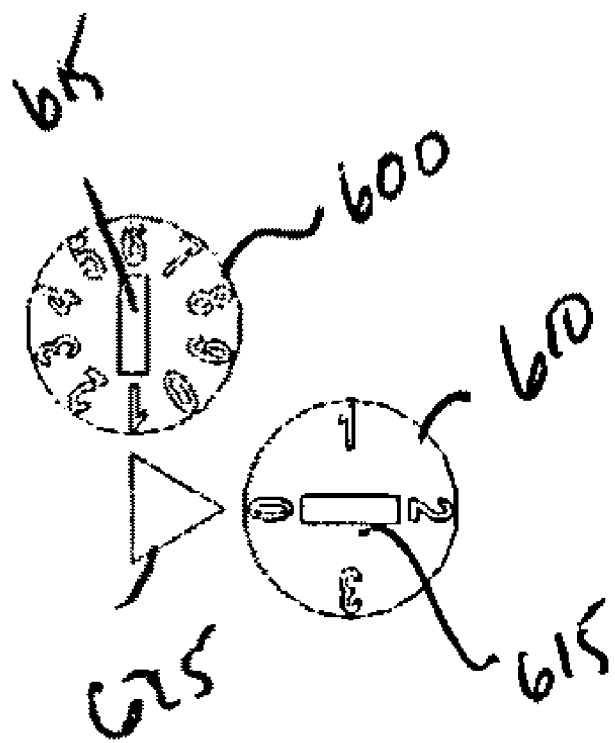
Fig 9

Fig. 10

UTS BK001-25-003 logo  item  size  cavity

MALE BUCKLE

1000

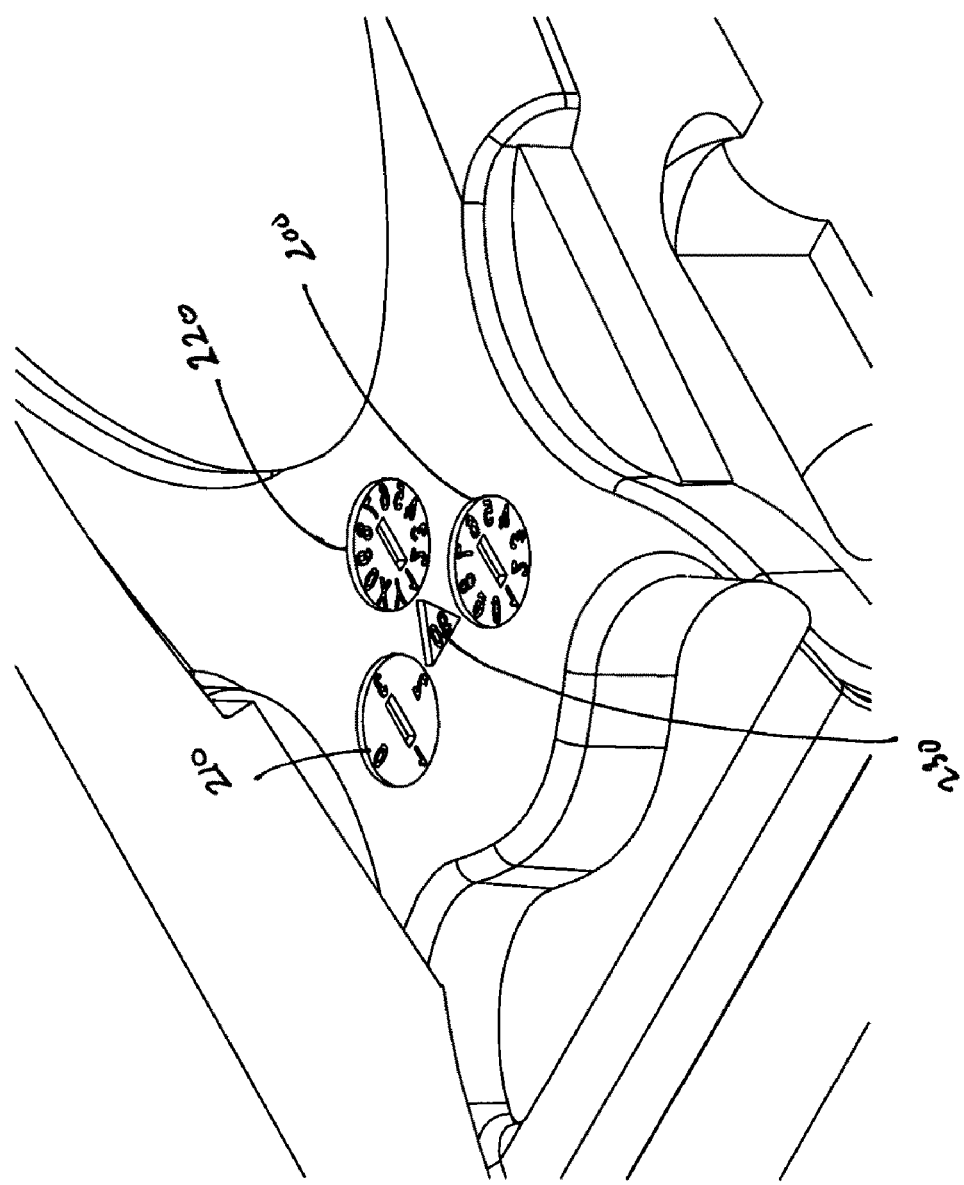

DATE CODE MARKING SYSTEM

BACKGROUND OF THE INVENTION

1. Field of the Invention

The invention is generally directed to a cooling system for injection molds, specifically for injection molds for creating buckles and other articles made by molding and molded articles wit identifying dates on the articles.

2. Description of the Prior Art

Injection molds are commonly used to shape plastic resin into usable products, for example buckles. According to the method, resin is injected into the cavity of a mold to form the desired shape. Sometimes there is a defect in the mold or the resin and it is almost impossible to determine where or when such defect occurred since these products are mass produced.

Plastic buckles are used on many products such as jackets, gloves, knapsacks and sports equipment. These buckles need to be reliable and sturdy. If there is a defect in a particular line of buckle or in a particular buckle, the manufacturer needs to be able to determine from which mold line, mold cavity and on what date the buckle was processed. Also, due to problems with particular batches of resins used or problems with the manufacturing process the final molded products may have defects.

Presently, there is no method or device to code these items in order to properly locate where the defect occurred. Finding where the defect occurred is useful for many reasons, one for example, is to be able to recall any defective products without the need to recall all production, much of which may be unaffected by the problem.

Accordingly, there is a need for an improved method for coding the molds with a reference as to the date mold and cavity number so that it is easier to find the defect. This needs to be accomplished without significantly affecting the cost, labor involved and time to manufacture the product.

SUMMARY OF THE INVENTION

The invention is generally directed to a method and device to code a molded item without the need for significant labor or skills.

Accordingly, it is an object of the invention to provide an improved device for coding an injection molded item to facilitate the determination of the defective mold and cavity.

Another object of the invention is to provide an improved method of coding an injection molded item without affecting the manufacturing process.

Yet another object of the invention is to provide an improved method of coding an injection molded item that is easy to use without sacrificing cost or manufacturing time.

A further object of the present invention is to provide a method of being able to identify all products that have been produced by a defective mold cavity and be able to track and recall such products.

Still another object of the invention is to produce a molded part with a permanent record of its provenance without affecting its utility.

Still other objects and advantages of the invention will, in part, be obvious and will, in part, be apparent from the specification.

The invention accordingly comprises the features of construction, combinations of elements, arrangements of parts and steps and procedures which will be exemplified in the construction as hereinafter set forth, and the scope of the invention will be indicated in the Claims.

BRIEF DESCRIPTION OF THE DRAWINGS

For a fuller understanding of the invention, reference is made to the following description taken in connection with the accompanying drawings, in which:

FIG. 9 shows a top plan view of a fifth embodiment of the coding made by the mold markers;

FIG. 10 shows a top plan view of a sixth embodiment of the coding made by the mold markers;

FIG. 14 shows a perspective view of the mold markers placed in the mold cavity for producing the design of FIG. 5.

DETAILED DESCRIPTION OF THE PREFERRED EMBODIMENTS

The invention is generally directed to a method to manufacture molded parts and the molded parts coded to allow one to determine where a defect has occurred during an injection molding process, from which mold and cavity, and on what date the parts were made. Buckles are generally made by use of a male molded portion and a female molded portion. Each mold comprises at least one cavity and often has many cavities into which a plastic resin is injected to create the molded product. In the case of buckles, one cavity is used to create the male portion and another to make the female portion. The present invention describes a device and method for coding cavities of the mold for making the male and/or female portions to track when and where a specific one was formed.

Figure 1:
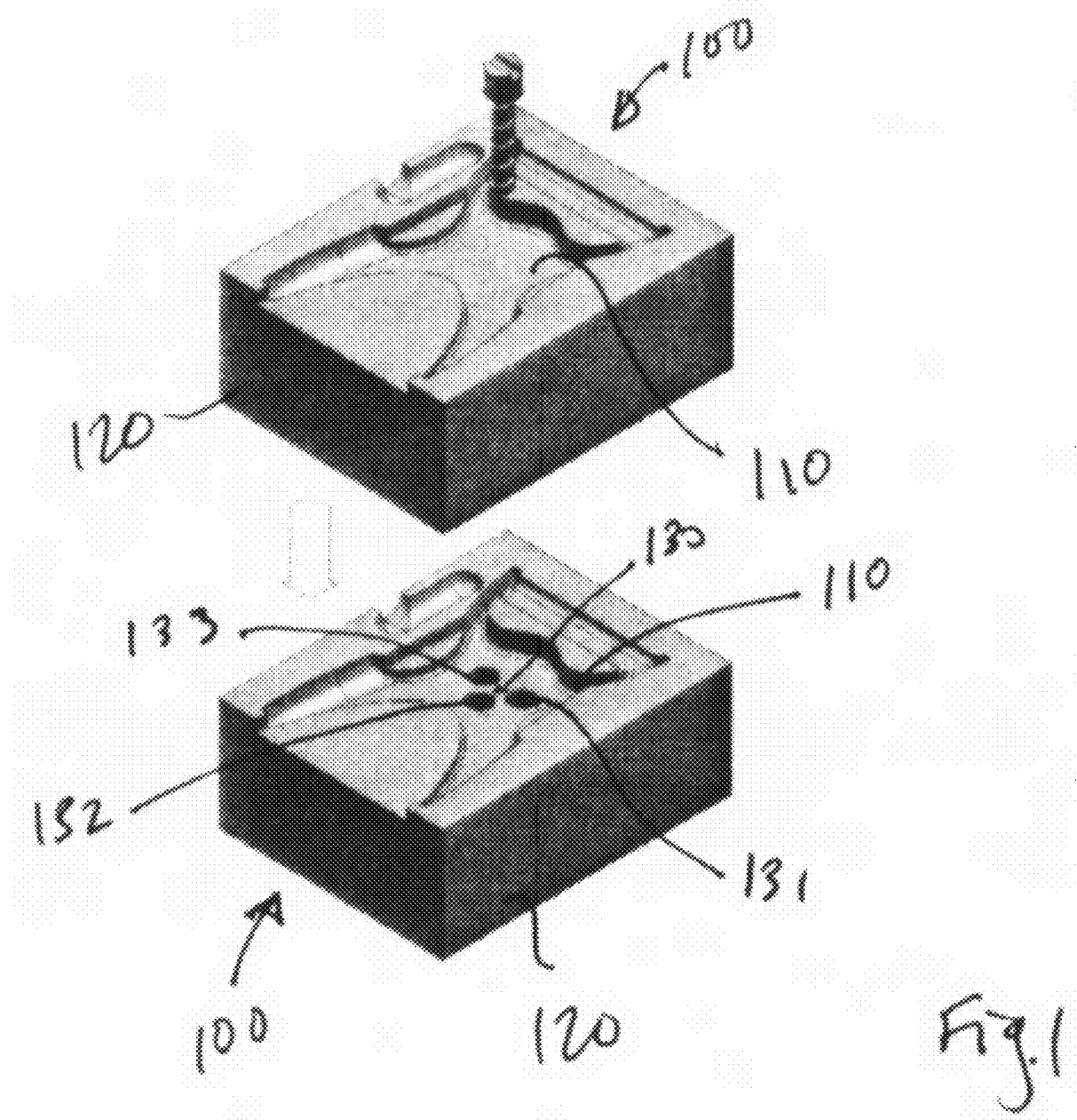
FIG. 1 is a perspective view showing the process of drilling the holes in the mold cavity with the top half being the mold with a drill poised and the bottom half being the mold after three holes have been drilled.

As shown in FIG. 1, a mold 100 having a cavity 110 for forming a buckle portion, in this case a male buckle portion, and a base portion 120 is shown. FIG. 1 shows on the top half of the mold 100 for a single molded buckle. The other half of the mold is not shown as the lower mold piece in FIG. 1 is the same mold part 120 as shown in the upper half, but with receiving area, 130, 131, 132, 133 drilled. The base portion 120 contains or has added to it the generally known equipment needed to properly heat and cool the molded material in a conventional fashion. As shown in FIG. 1, four receiving areas 130, 131, 132 and 133 for holding the markers are disposed in the cavity. In a preferred embodiment, the receiving areas are through holes drilled through the cavity to receive markers shown in FIGS. 2 and 3.

Figure 2:
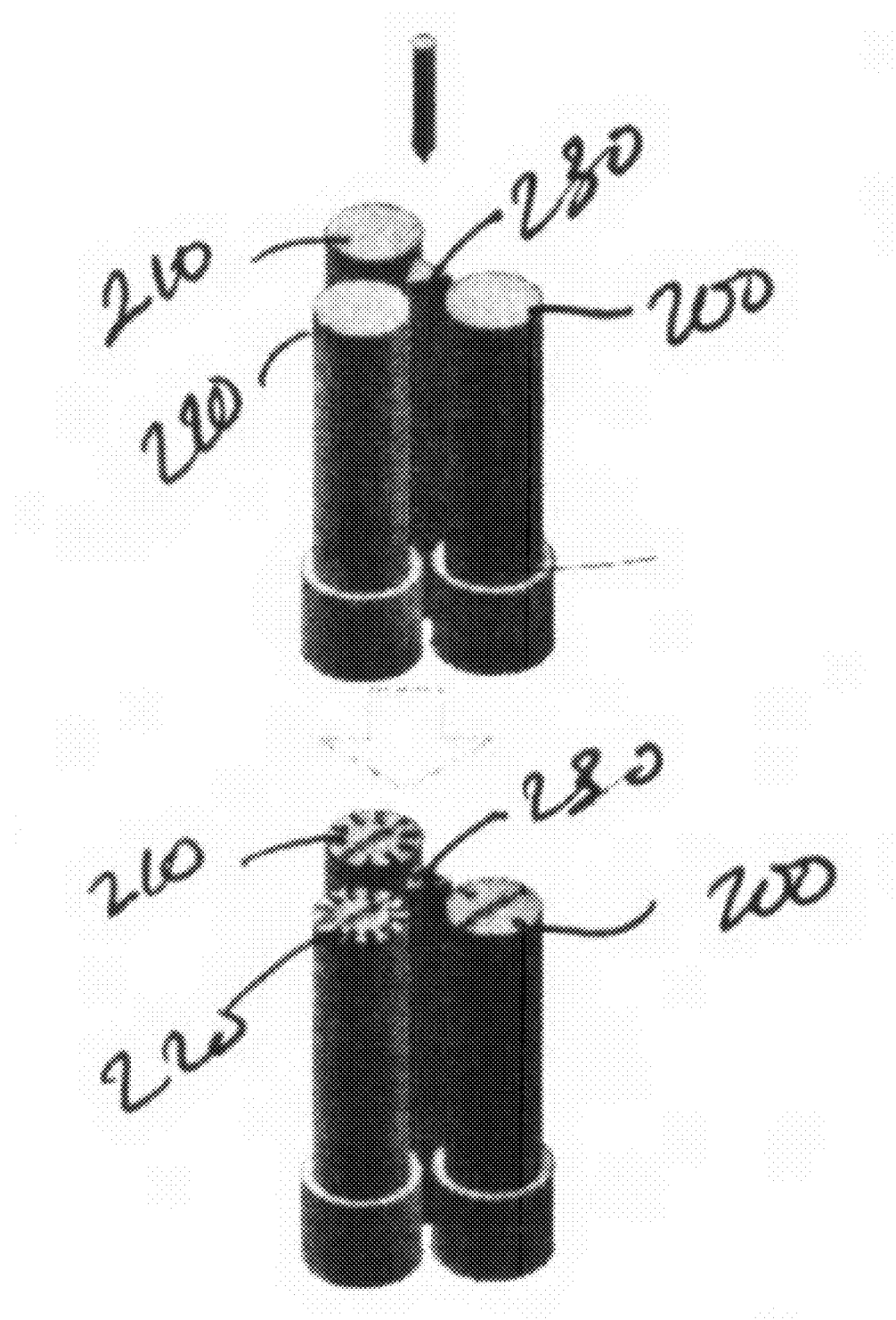
FIG. 2 is a perspective view of the mold markers before and after etching the dates on them.

As shown in FIG. 2, in a preferred embodiment of the mold coding device, the marking device consists of dials 200, 210 and 220 that are attached to the ends of cylinders 201, 211 and 221. There is also a year marker 230 which does not necessarily need to be cylindrical in shape as this marker does not need to be changed on a daily basis. In a current preferred embodiment, marker 230 is triangular in shape with each corner of the triangle acting as a pointer to one of the dials 201, 211 and 221. The dials contain numbers, letters or other symbols to assist in indicating the date and other indicia used to locate the proper mold or cavity. The upper portion of FIG. 2 shows the dials 200, 210, 220 and year marker 230 as mentioned. The lower portion of FIG. 2 shows the dials marked.

Figure 3:
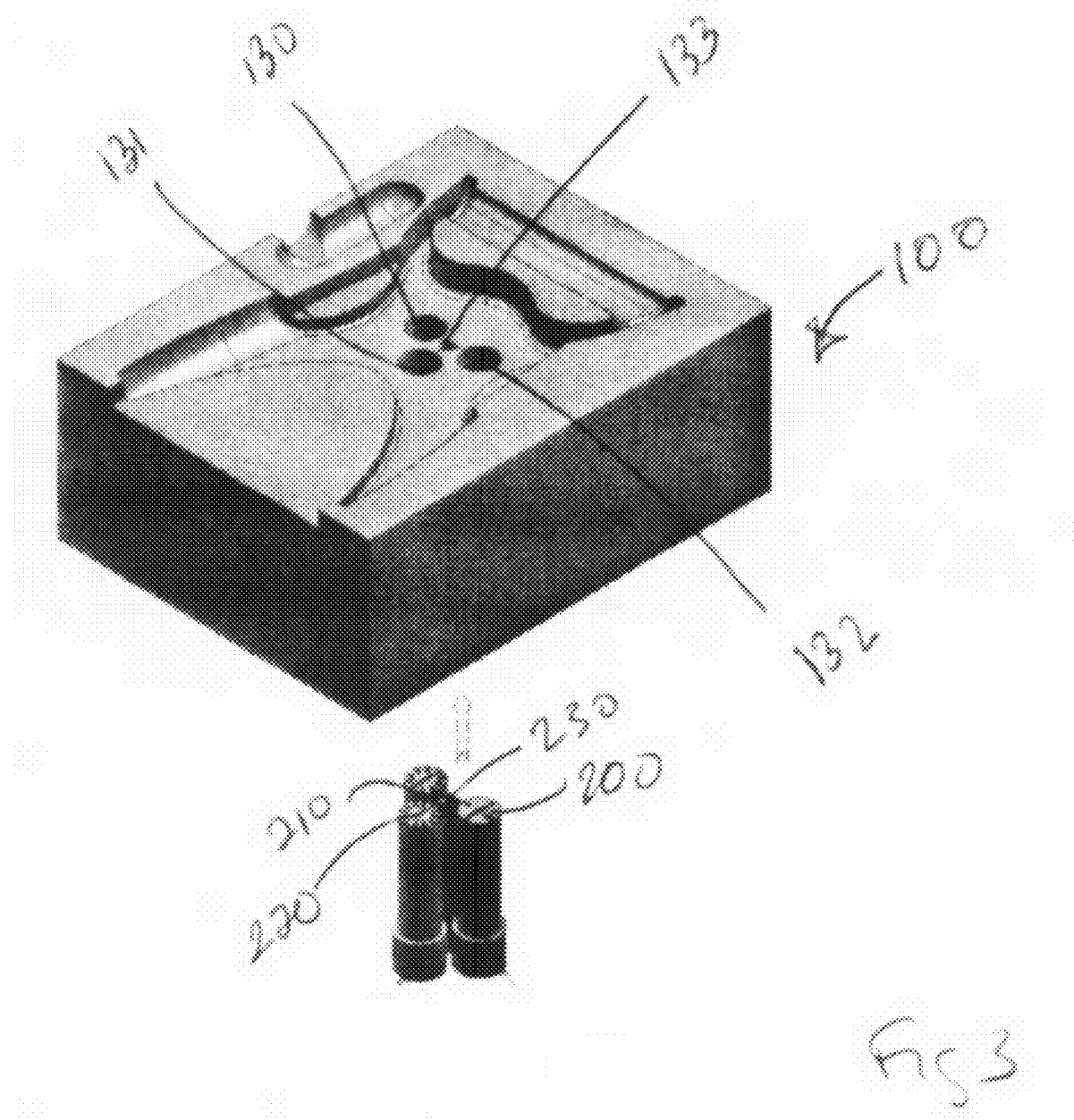
FIG. 3 is a perspective view of the mold markers being inserted into the holes in the mold cavity.
Figure 4:
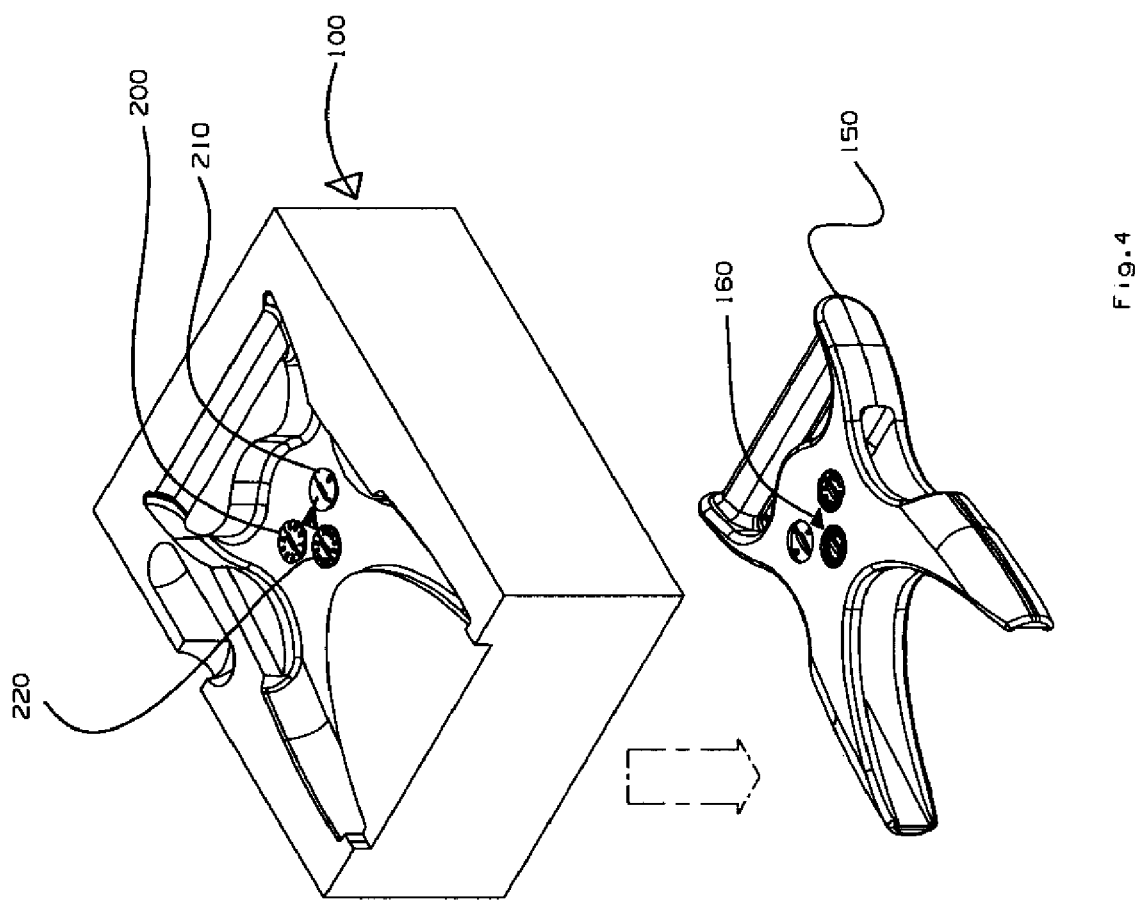
FIG. 4 is a perspective view of the mold of FIG. 3 with the mold markers in place and the buckle piece produced from the mold cavity.
Figure 13:
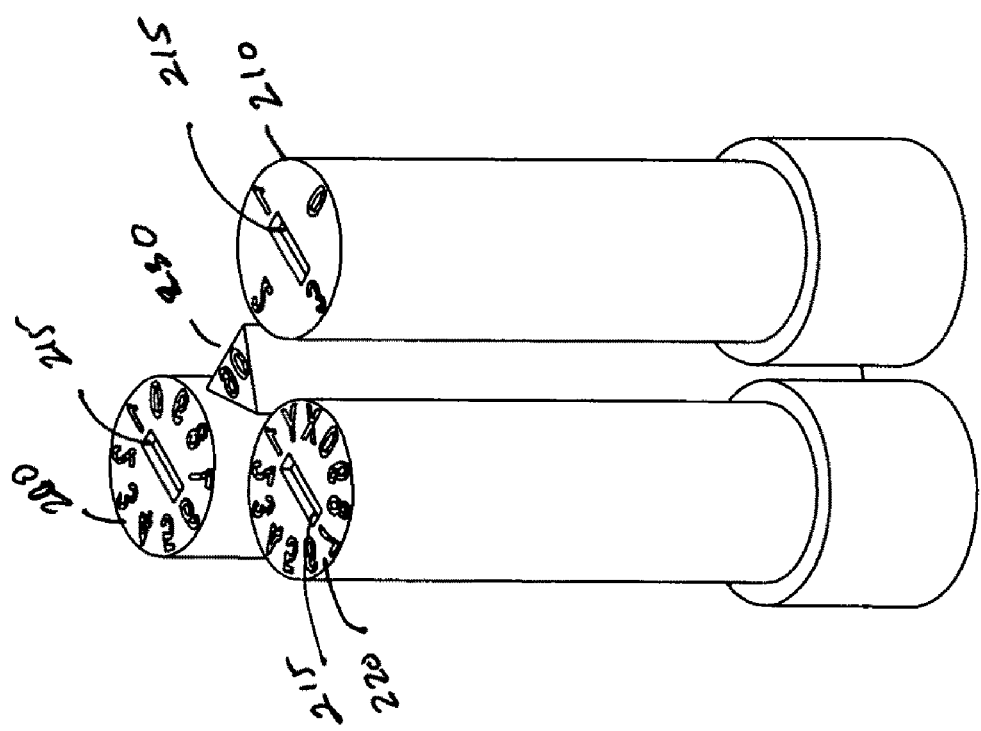
FIG. 13 shows a perspective view of what the actual mold maker for the coding for the mold marker design of FIG. 5 to produce the design of FIG. 5 on the molded article.

As shown in FIG. 3, the markers are inserted into the mold 100 such that the heating and cooling equipment (not shown) rests against the back of the markers to hold them in place so that they don't fall out if the mold is moved around and in use or when the resin is injected under pressure into the mold. The dial portion of the markers 200, 210, 230 rest in the bottom of the cavity such that when the molded piece is removed from the cavity, it now contains the image of the markings indicated on the mold markers. The information provided on the dials appears on the finished piece as the inverse of what is on the dial, so when the information is pressed onto the molded part, it is in legible form. For ease of explanation, the drawings in the Application show the information how it would be seen on the molded item. FIGS. 13 and 14 show the actual appearance of the markers to produce the coding design shown in FIG. 5 on the molded part. FIG. 4 shows the molded piece 150 having been marked by the marking device. As seen, the molded piece now contains a reference area 160 which can be selected by the manufacturer, which includes the imprint of the markers 200, 210, 220 and 230.

Figure 5:
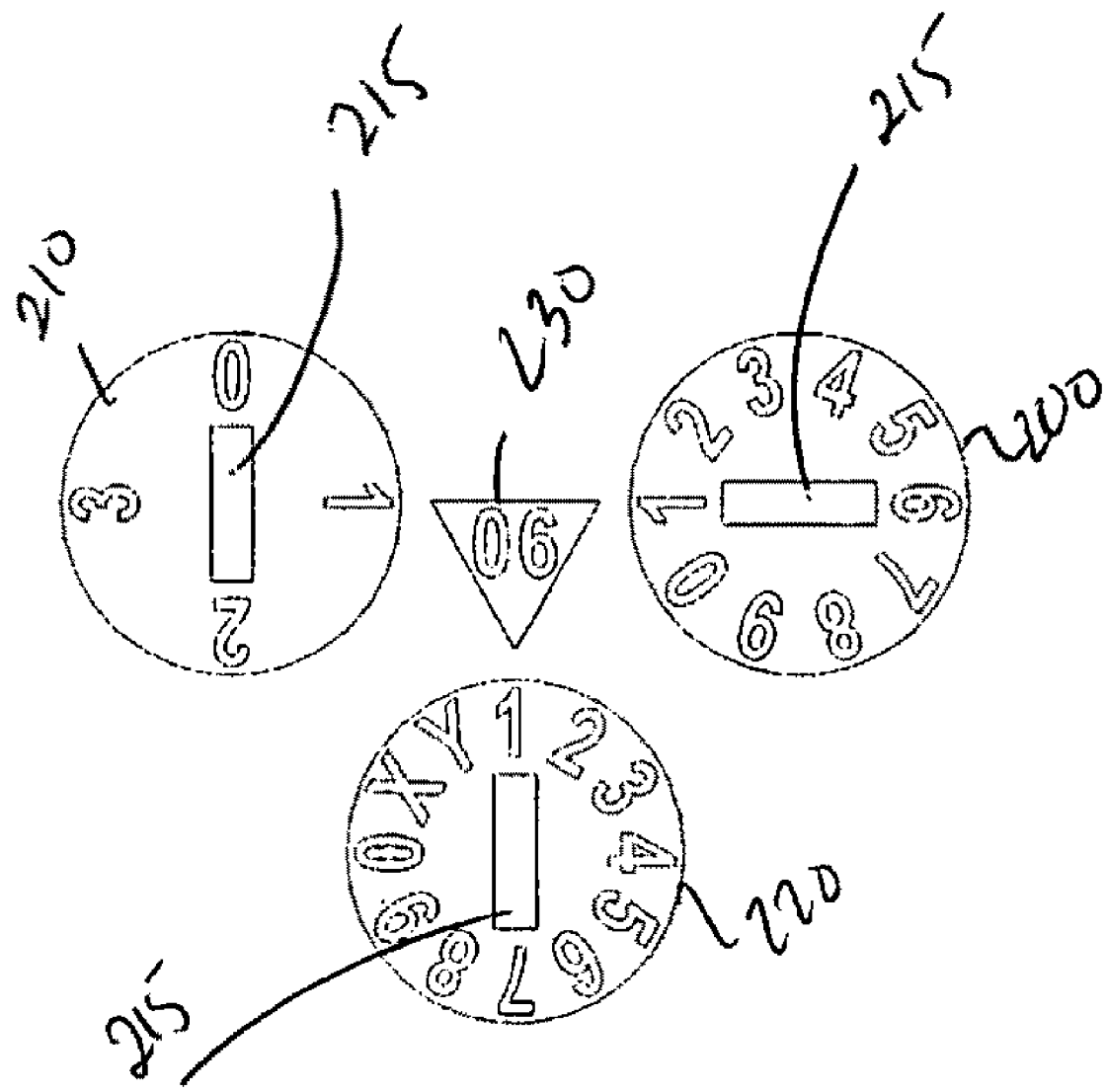
FIG. 5 shows a top plan view of a first embodiment of the coding made by the mold markers.

Reference is made to FIG. 5 wherein the display of dials 200, 210, 220 and 230 is shown on a molded piece. Each dial indicates a reference for example to the date the mold is run. In a preferred embodiment as shown in FIG. 5, dial 220 indicates the month, dial 210 indicates the day (×10) and dial 200 indicates the day (×1). Year marker 230 in the shape of a triangle acts as the pointer indicating which symbol on the three dials, 200, 210 and 220 is selected. Each corner of the triangle acts as the pointer for one of the dials. For the month dial 220 the numbers one through nine correspond to January through September with "o" corresponding to October, "x" to November and "y" to December. For example, as shown in FIG. 5, the date indicated is Jan. 11, 2006. The dials on the mold and in the multi-cavity mold on each cavity with a date of manufacture indication need to be adjusted every day so as to accurately display the date of the mold run. Prior to running the mold on a new day, a technician would adjust the dials to the appropriate date, generally with a screwdriver or other similar tool and insert the cylinder or cylinders into the mold. When the information needs to be changed, a detent or slot in the dial corresponding to the line 215 is disposed in the dial to allow for a screw driver or other tool to be inserted therein to turn the dial. FIG. 5 shows the part with the indicators molded onto it. Thus, line 215 shows a positive line, which corresponds to a slot in the actual dial in the cavity. Again, the actual mold cavity and dials would have the inverse of the symbols so that when a part is molded the symbols will appear in a legible form on the molded item.

The year marker 230 denotes the year in which the mold was run. This marker only needs to be changed once a year.

Focusing on the indicator layout differences, FIGS. 6-9 show variations of the assembly of the mold markers. Again, what is shown is the impression these molds would make on the molded part. In these embodiments another marker 325, 425, 525 and 625 is added to indicate the month or day. In these embodiments, dials 320, 420, 520 and 620 display the month, dial 310, 410, 510 and 610 display the day (×10) and dials 300, 400, 500 and 600 display the day (×1).

Figure 6:
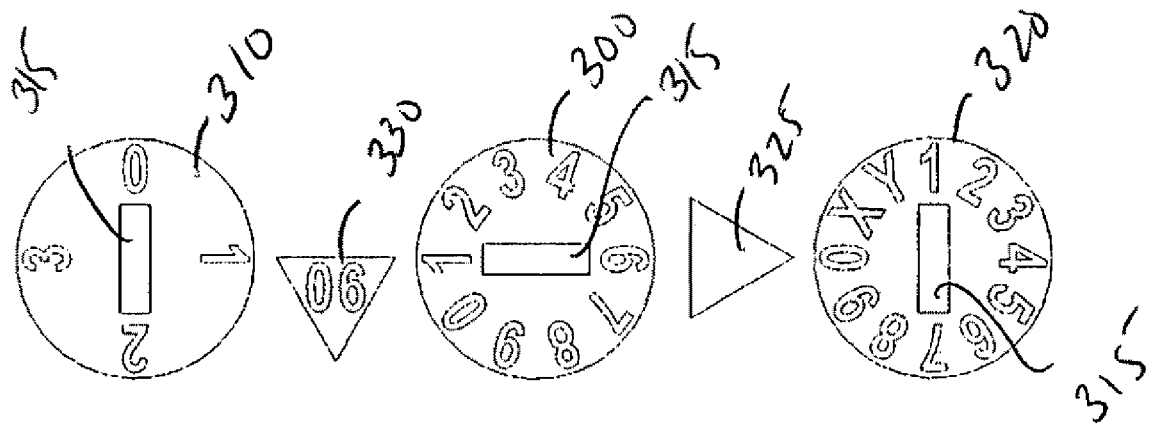
FIG. 6 shows a top plan view of a second embodiment of the coding made by the mold markers.
Figure 7:
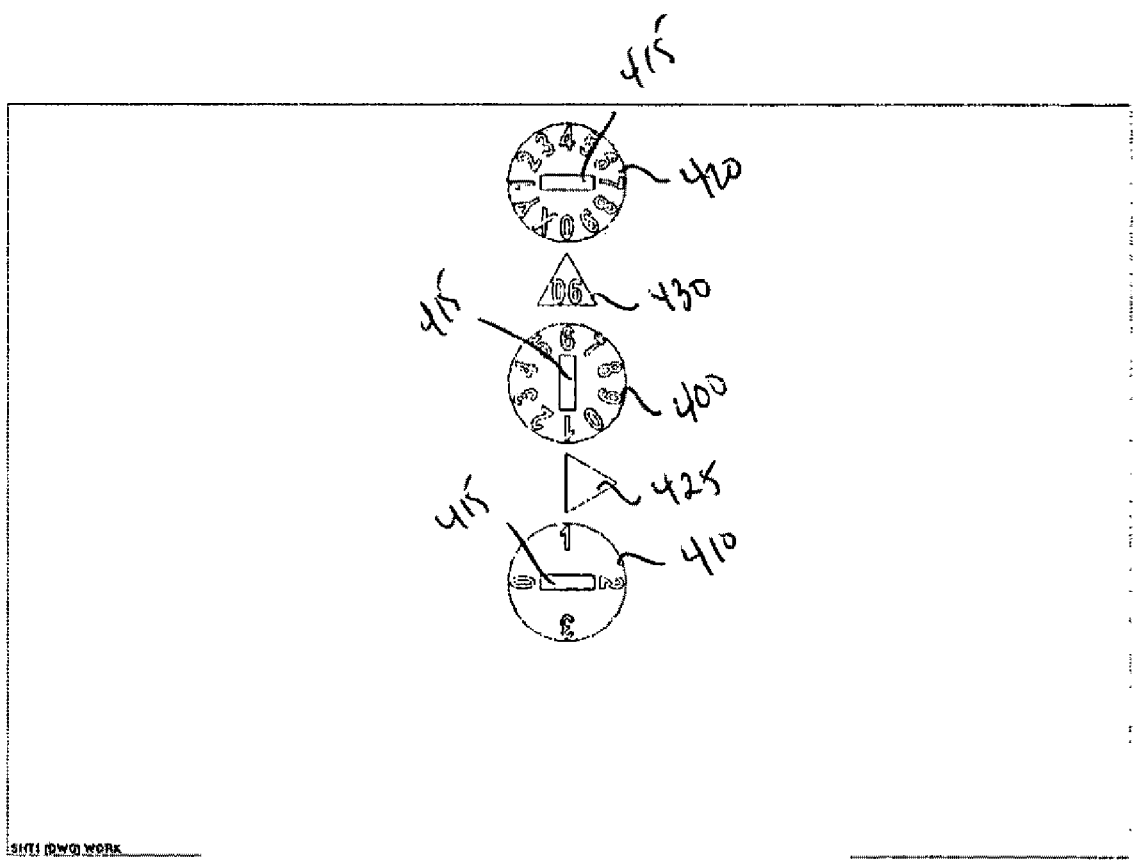
FIG. 7 shows a top plan view of a third embodiment of the coding made by the mold markers.
Figure 8:
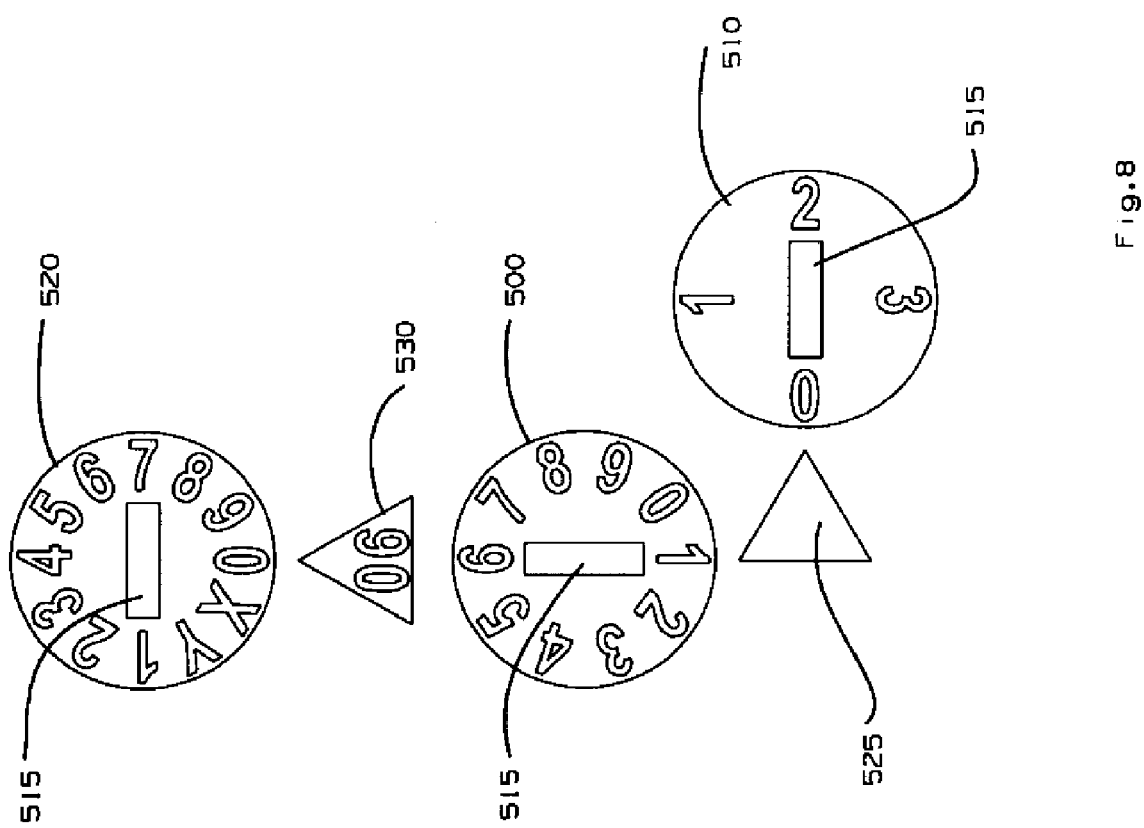
FIG. 8 shows a top plan view of a fourth embodiment of the coding made by the mold markers.

For example, as shown in FIG. 6, the date indicated is Oct. 11, 2006. In FIG. 6 triangular marker 325 would be a permanent one and would not require changes. It may, however, be used for other permanent identifying markers like the mold and cavity information, a manufacturer's name or model size. As mentioned above, these dials need to be adjusted by use of a detent, 315, 415, 515 and 615, every day so as to accurately display the date of the mold run on the molded piece. The present invention also contemplates the use of other shaped mechanisms, other than a dial, to provide the information on the molded item. FIGS. 5-9 show a variety of different geometrical configurations of the mold dials with the same information. The arrangement shown in FIG. 5 is the current preferred embodiment in which the three dials 200, 210 and 230 are clustered about triangular year marker 230. However, as the date codes are not intended to interfere with the use or visual appearance of the molded part, they are generally preferred to be placed in a relatively flat, underneath location on the molded part. In some cases the cluster of the three dials 200, 210 and 220 and year marker 230 don't fit in one spot. The layouts of FIGS. 6-9 show arrangements in which the three dials and year marker are arranged horizontally in a line (FIG. 6), vertically in a line (FIG. 7), in an "L" shape (FIG. 8) or separated in two spots. Other configurations, including separate locations for each of the dials, are possible. Generally, as the dials are separated, additional pointers are required.

Shown in FIG. 10 is an additional information marker 1000. Additional information is indicated on the molded portion such as a company name, item, size and cavity of the mold by use of plate disposed into the mold cavity. Generally, this information does not change and can be permanently placed inside the mold cavity, by a permanent plate or perhaps manufactured into the mold itself. This information can either be pressed into the other of the two buckle portions or on the same buckle portion as the date indicators. This depends on the surface area available on the molded piece. This information helps narrow down the mold and cavity used to produce the defective part and locate other potentially defective parts made from the same cavity, resin or mold run. When a defect in a part occurs, the part itself contains an indication thereon to trace back to the manufacturer, the date of the run, the mold line and cavity. This allows for easy and more efficient recall of other potentially defective parts. Also, when testing determines a problem with a particular piece then the information can be used to determine the scope and source of the problem.

The criteria for placement of the desired information on the molded piece are dependent upon the surface area available. In a current preferred embodiment, a relatively flat surface area of 10 mm×10 mm is desired. The information is preferably placed on a generally flat surface of the resulting piece. Placement of the desired information on a generally flat surface makes incorporating the marking device into the mold easier and provides for a more legible result. The dials of the present invention are small, for example 4 mm in diameter. The dials can be rotated either by hand or preferably by the use of some sort of tool such as a flat head screwdriver in the slots which produces the lines to the middle of the dials such as 215, 315, 415, 515 and 615.

Figure 11:
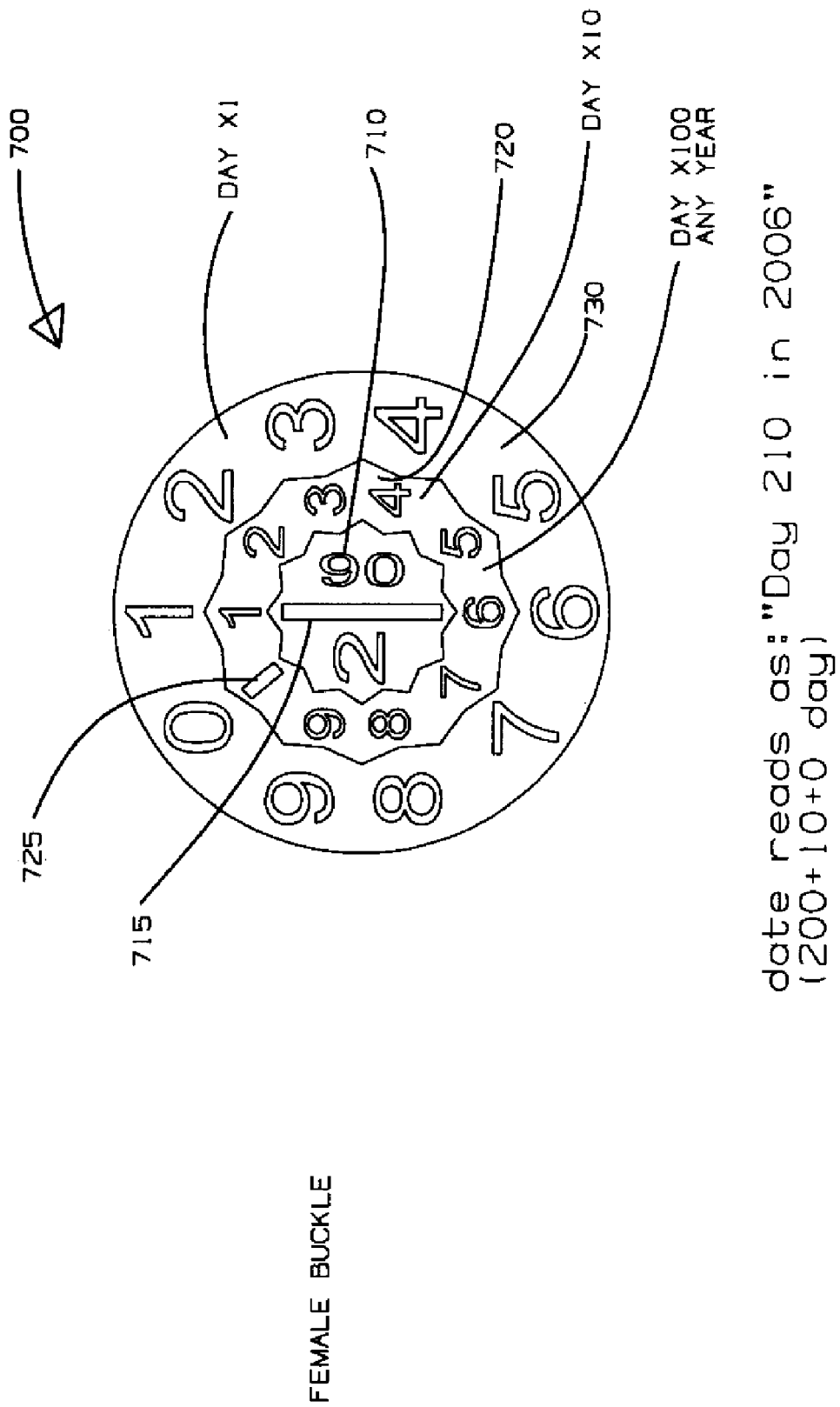
FIG. 11 shows a top plan view of a seventh embodiment of the coding made by the mold markers.

FIG. 11 shows another embodiment of the mold marker system showing a multi-layered dial 700 for indicating the date of the mold run. The center dial 710 indicates the day (×100) and year. The middle dial 720 indicates the day (×10) and the outer dial 730 indicates the day (×1). The middle dial 710 has a slot which corresponds to line 715. This allows rotation of dial 710 and the end pointing upwardly to the right of the one date ×100, which points to the valve on the date ×10 dial 720. Similarly, slot 725 on the dial 720 points to the date on dial 730. In this case the indicated date is Day 210 in 2006, which is Jul. 29, 2006. The dials 710, 720, 730 are shown in FIG. 11 to have star-shaped, non-rounded edges which interlock with the adjacent dial. In other preferred embodiments, the dials can be rounded perimeters and inner rings as shown in the embodiments of FIGS. 5-9 to make turning the dials easier. Pointer 715 can be designed with an arrow or other distinguishing mark to enhance the rapid readability of this pointer.

Figure 12:
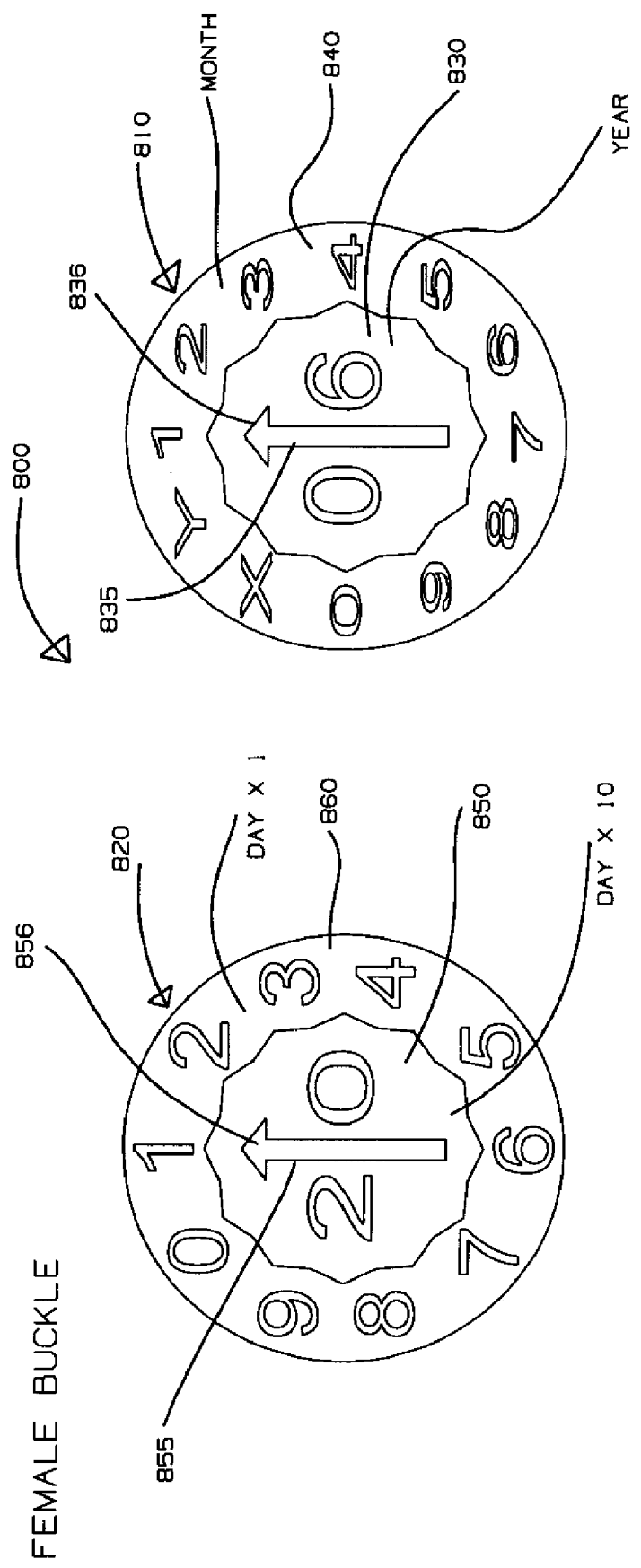
FIG. 12 shows a top plan view of an eighth embodiment of the coding made by the mold markers.

In another embodiment of the present invention shown in FIG. 12, double-layered dial system 800 is shown and includes double dials 810 and 820. In this case, inner wheel 830 of dial 810 indicates the year and outer wheel 840 indicates the month. Dial 820 has pointer 835 on wheel 830 which points to the inner dial 850 that indicates the day (×10), and an outer dial 860 that indicates the day (×1). Inner dial 850 includes a pointer 855, which is a slot on the actual dial in the mold cavity for turning the dial, with an arrow head 856 to act as the pointer for the outer dial 870. Similarly, on dial 810, pointer 835 on inner wheel 830 has an arrow head 836 to point to the selected valve on outer wheel 840. As can be seen the indicated date is Day 21 in Jan. 2006.

Accordingly, an improved method of making molded parts with manufacturing information on the part and a system for identifying manufacturing data on a molded part is provided. The system includes imprinting date and cavity data on molded parts. The invention is also directed to a molded part with manufacturing information imprinted into the part to identify the provenance of the part.

It will thus be seen that the objects set forth above, among those made apparent in the preceding description, are efficiently obtained and, since certain changes may be made in the above constructions without departing from the spirit and scope of the invention, it is intended that all matter contained in the above description or shown in the accompanying drawings shall be interpreted as illustrative, and not in a limiting sense.

It is also to be understood that the following claims are intended to cover all of the generic and specific features of the invention, herein described and all statements of the scope of the invention which, as a matter of language, might be said to fall therebetween.

What is claimed is:

1. A date code marking system comprising:
   three dials each attached an end of a cylinder, said three dials being arranged in a triangular arrangement, a first one of said dials having reference to a day (x 1), a second one of said dials having reference to a day (x 10), and a third one of said dials having reference to a month; and
   a triangular year marker arranged between said three dials, said triangular year maker having three corners each acting as a pointer to one of said dials, said triangular year marker acting as a pointer indicating which symbol on said dials is selected.

2. The date code marking system as claimed in claim 1, wherein said dials are each provided with a detent for rotating said dials to choose information to be selected by said triangular year marker.

* * * * *